United States Patent [19]

Suzuki et al.

[11] Patent Number: 5,005,536
[45] Date of Patent: Apr. 9, 1991

[54] ENGINE INDUCTION SYSTEM

[75] Inventors: Takamitsu Suzuki; Takeshi Iwanami; Minoru Yonezawa, all of Iwata, Japan

[73] Assignees: Yamaha Hatsudoki Kabushiki Kaisha, Shingai, Japan; Yamaha Hatsudoki Kabushiki Kaisha, Iwata, Japan; Yamaha Hatsudoki Kabushiki Kaisha, Shizuoka, Japan

[21] Appl. No.: 563,818

[22] Filed: Aug. 3, 1990

Related U.S. Application Data

[63] Continuation of Ser. No. 440,646, Jan. 24, 1989, abandoned.

[30] Foreign Application Priority Data

Nov. 25, 1988 [JP] Japan ................. 63-296039

[51] Int. Cl.⁵ .............................................. F02M 35/00
[52] U.S. Cl. .............................................. 123/52 MV
[58] Field of Search ......... 123/52 M, 52 MB, 52 MF, 123/52 MV, 52 MC

[56] References Cited

U.S. PATENT DOCUMENTS

| | | | |
|---|---|---|---|
| 2,916,027 | 12/1959 | Chayne et al. | 123/52 MV |
| 4,641,610 | 2/1987 | Rutschmann | 123/52 MV |
| 4,649,876 | 3/1987 | Ohmi et al. | 123/302 |
| 4,827,879 | 5/1989 | Ohmi et al. | 123/52 MV |

FOREIGN PATENT DOCUMENTS 2591665 6/1987 France .
2180594A 4/1987 United Kingdom .

Primary Examiner—David A. Okonsky
Attorney, Agent, or Firm—Ernest A. Beutler

[57] ABSTRACT

Two embodiments of compact high performance induction systems for V type engines that include pairs of plenum chambers that extend over the respective cylinder banks. First pairs of runners extend from an inlet opening in each plenum chamber to an outlet opening that communicates with the cylinder of the opposite bank. Second pairs of intake passages are provided which extend from inlet openings in the respective plenum chambers to outlet openings in the cylinders of the adjacent cylinder head. The first intake passages have portions that extend through the other plenum chambers and the second intake passages communicate with the cylinders through these intermediate portions. The intermediate portions are curved and in one embodiment the second intake passages are tangential to these curved portions and in the other embodiment they are radial to it.

61 Claims, 4 Drawing Sheets

ENGINE INDUCTION SYSTEM

This is a continuation of U.S. Pat. application Ser. No. 440,646, filed Nov. 24, 1989, now abandoned.

BACKGROUND OF THE INVENTION

This invention relates to an engine induction system and more particularly to a high performance compact engine induction system particularly adapted for use with V type engines.

It has been recently acknowledged that the performance of an internal combustion engine can be significantly improved by providing a compound induction system for each cylinder of the engine wherein there is provided a relatively short intake passage that is tuned for good high speed performance and a relatively long intake passage that is tuned for low speed performance. In order to fully optimize the advantages of such an arrangement and provide a relatively compact assembly, it has also been proposed to provide a pair of plenum chambers, each of which supplies air to a respective one of the intake passages at its inlet end. This type of induction system has particular utility with V type engines wherein each of the plenum chambers can be positioned above a respective one of the cylinder banks. An induction system of this general type is shown in U.S. Pat. No. 4,649,876, entitled "Intake Means Of Internal Combustion Engine", issued Mar. 17, 1987 in the names of Masatoshi Ohmi et al and assigned to the assignee of this application.

This type of induction system is particularly effective in providing good performance throughout the entire engine load and speed ranges without sacrificing performance under any running condition. However, the complexity of the induction system can give rise to certain difficulties in connection with vehicles wherein engine height is critical. That is, in the type of induction system shown in U.S. Pat. No. 4,649,876 can give rise to a significant increase in the height of the engine even though the system is relatively compact.

It is, therefore, a principal object of this invention to provide an improved high performance type of induction system wherein each cylinder of the engine is served by both long low speed runners and short high speed runners and wherein the induction system nevertheless is extremely compact.

It is a further object of this invention to provide an improved compact induction system for an internal combustion engine.

It is a further object of this invention to provide an induction system for a V type internal combustion engine that employs separate plenum chambers and pairs of intake passages for each cylinder of the engine served respectively by the plenum chambers that is compact and yet does not sacrifice performance.

SUMMARY OF THE INVENTION

A first feature of this invention is adapted to be embodied in an induction system for a V type engine that is comprises of a pair of angularly disposed cylinder banks each formed with at least one cylinder. First and second plenum chambers are provided, each of which lies above a respective one of the cylinder banks. Means are incorporated for admitting an atmospheric air charge to the plenum chambers. A first pair of intake passages are provided, each of which has an inlet opening in one of the plenum chambers and an outlet communicating with a cylinder of the opposite bank and an intermediate portion which passes at least in part through the other plenum chamber. A pair of second intake passages are provided, each of which extends from one of the plenum chambers to the cylinder of the adjacent bank.

Another feature of the invention is adapted to be embodied in an induction system for an internal combustion engine having a pair of angularly disposed cylinder banks, each formed with at least one cylinder bore. A pair of cylinder heads are each affixed to a respective one of the cylinder banks and close the cylinder bore thereof. A pair of plenum chambers are provided, each of which lies generally vertically above the respective one of the cylinder heads. An intake passage is formed in each cylinder head for supplying each cylinder bore thereof with an intake charge. A first series of intake runners extend from each of the plenum chambers to an intake passage of the adjacent cylinder head. A second series of intake runners extend from each of the plenum chambers to the intake passages of the remotely positioned cylinder head and have a curved portion. The first runners are substantially shorter than the second runners and intersect the curved portion of the second runners.

DETAILED DESCRIPTION OF THE PREFERRED EMBODIMENTS OF THE INVENTION

Figure 1:
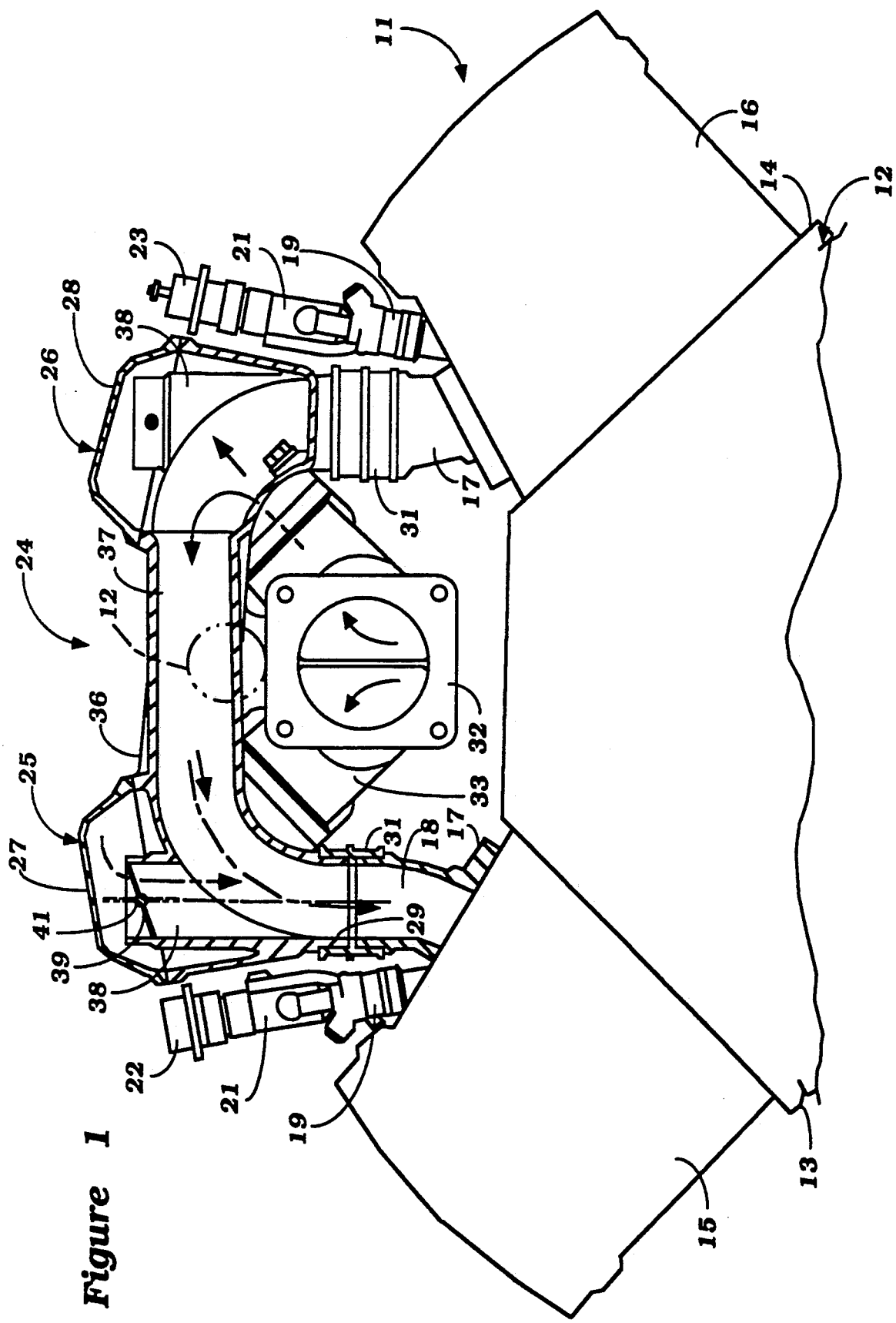
FIG. 1 is a partial front elevational view of an internal combustion engine constructed in accordance with an embodiment of the invention, with a portion broken away to more clearly show the construction.
Figure 2:
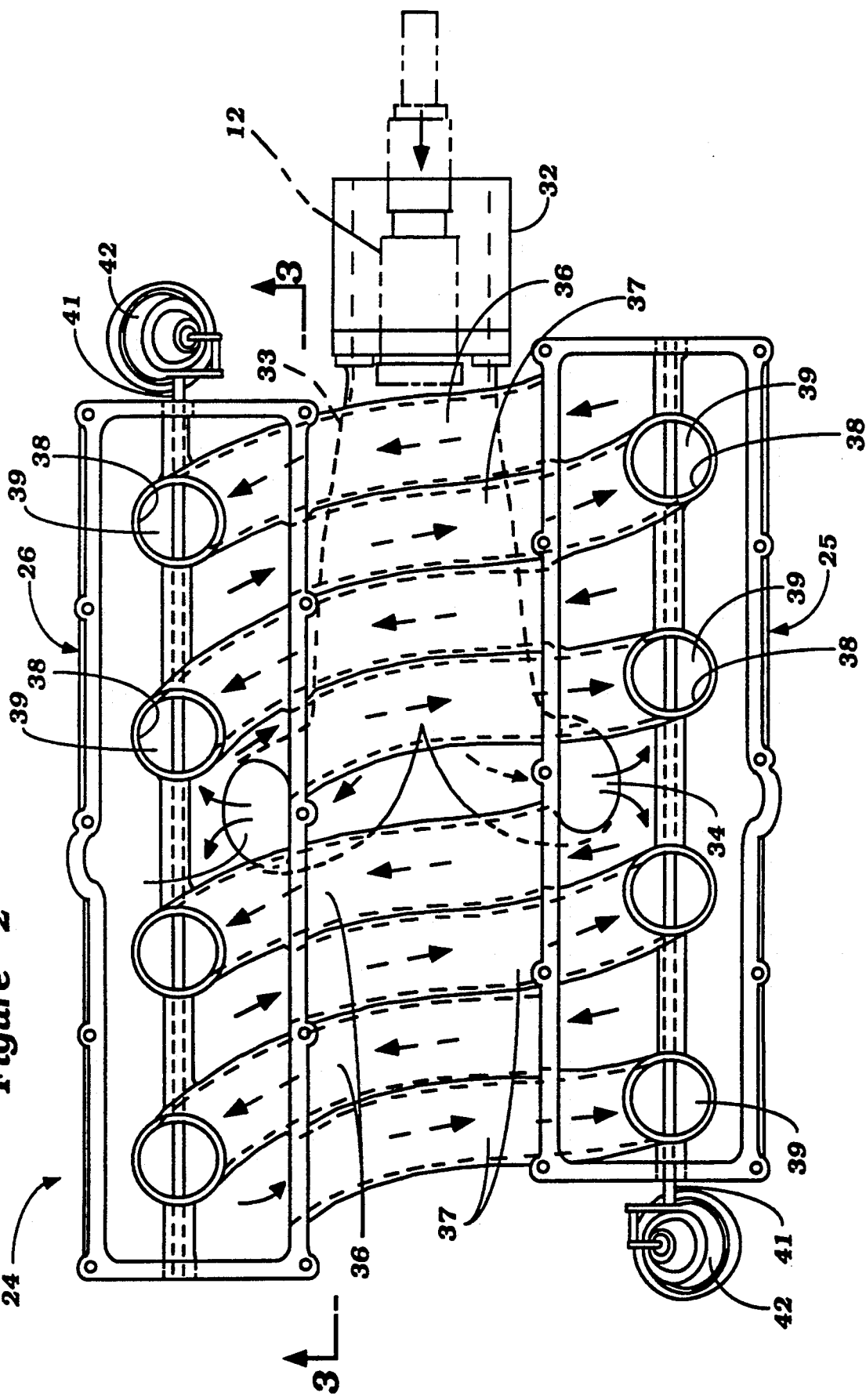
FIG. 2 is a top plan view showing the induction system of the engine in FIG. 1.
Figure 3:
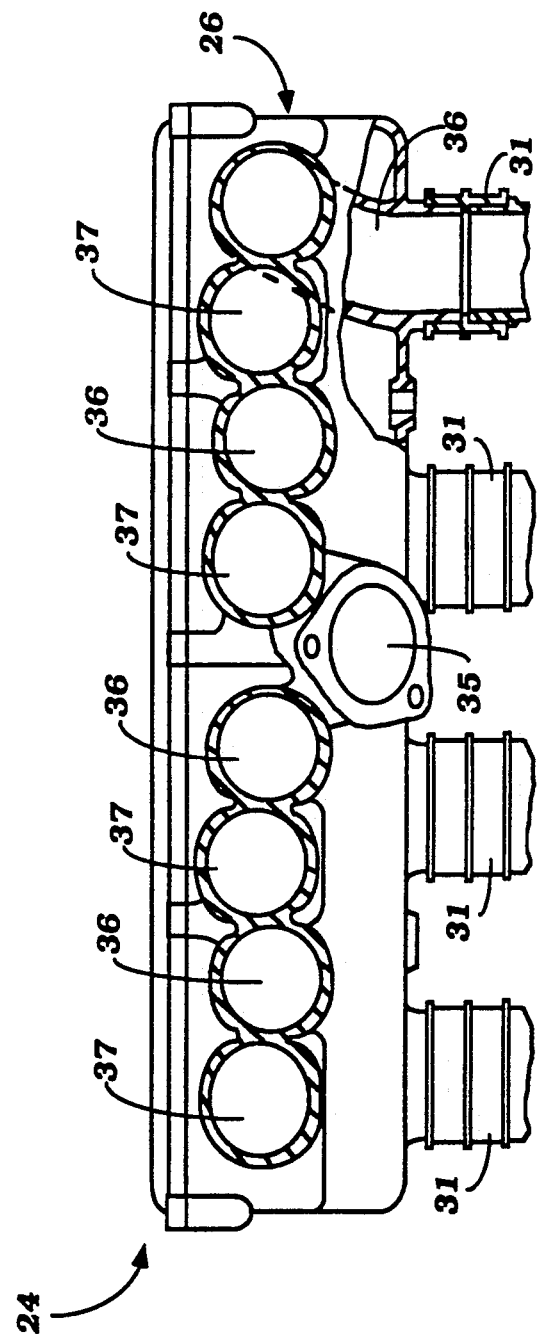
FIG. 3 is a cross-sectional view taken generally along the line 3—3 of FIG. 2.

Referring first to the embodiment of FIGS. 1 through 3, a V type engine constructed in accordance with this embodiment of the invention is identified generally by the reference numeral 11. In the illustrated embodiment, the V engine 11 is of the four cycle eight cylinder type. It is to be understood, however, that certain facets of the invention can be utilized with engines having other cylinder numbers, in-line or other cylinder configurations and, in fact, engines other reciprocating type engines. However, the invention has particular utility in connection with the type of engine described.

The engine 11 includes a cylinder block 12 having angularly disposed cylinder banks 13 and 14 to which respective cylinder heads 15 and 16 are secured in a known manner. The cylinder banks 13 and 14 form cylinder bores in which pistons reciprocate and which are connected to a crankshaft for driving it. Since the internal construction of the basic engine forms no part of the invention, it has not been illustrated. Description of it is therefore not believed to be necessary.

In conjunction with the invention, a pair of intake manifolds 17 are affixed to each of the cylinder heads 15 and 16 on the side facing the valley of the V of the engine. Theses intake manifolds 17 each have respective intake passages 18 that communicate with the individual cylinders of the engine. Each intake passage 18 may serve either a single intake port in the cylinder head 15 for each cylinder which is operated by a single intake valve or, alternatively, the intake passage 18 may cooperate with siamese type intake ports for each cylinder that are served by two or more intake valves. Again, since this construction forms no part of the invention, further description is not believed to be necessary. It is, however, a facet of the invention that a single intake passage 18 is provided for each cylinder of the engine regardless of the number of intake valves served by the intake passage 18. However, certain facets of the invention can be utilized in conjunction with engines having more intake passages per cylinder.

There is provided for each cylinder head 15 and 16 a series of fuel injectors 19 that supply fuel from a fuel manifold 21 under the control of an injection system which may be of any known type. This injection system includes a pulsation damper 22 and relief valve 23 which cooperate to reduce pulsations in the fuel manifold 21 and also to limit the maximum pressure therein. The injection nozzles 19 may be of any known type and may be electronically operated and provide port injection. Generally, there will be one injection nozzle 19 for each intake passage 18 although other variations are possible.

An induction system constructed in accordance with an embodiment of the invention is identified generally by the reference numeral 24 and is designed to provide an air charge to the intake passages 18 which is tuned to optimize performance throughout the entire engine load and speed ranges while maintaining a compact configuration. This induction system 24 is comprised of first and second plenum chambers 25 and 26 which lie over the cylinder heads 15 and 16 respectively and which extend generally for the full length of those cylinder heads. The plenum chambers 25 and 26 may be formed primarily from a single casting that has longitudinally extending openings over each of the plenum chamber portions 25 and 26 that are closed by closure plates 27 and 28, respectively. These closure plates may be affixed to the plenum chamber portions 25 and 26 in a suitable manner and FIG. 2 depicts the construction with the closure plates removed so as to more clearly show the internal construction.

The induction system 24 also includes a plurality of outlet openings 29 each of which registers with a respective one of the intake passages 18 of the manifold 17. An elastic coupling 38 provides a flow interconnection between the passages 29 of the induction system 24 and the passages 18 of the manifold 17 so as to allow some flexibility and provide a resilient interconnection. It should be noted that each plenum chamber 25 and 26 has a number of passageways 29 that is the same as the passageways 18 of the adjacent cylinder head 15 or 16.

An atmospheric air system is provided for delivering atmospheric air to each of the plenum chambers 25 and 26. This includes an inlet body 32 that is positioned at a level lower than the plenum chambers 25 and 26 and which is exposed at one end of the engine. A throttle valve arrangement (not shown) can be affixed to the inlet body 32 for throttling the intake air for engine speed control. In addition, an air cleaner and silencer (not shown) at an appropriate location delivers air to the inlet body 32. The inlet body 32 extends to an inlet manifold 33 that extends beneath the plenum chambers 25 and 26 and which terminates in a pair of branch passages 34 and 35 which open respectively into the plenum chambers 25 an 26 at approximately their midpoints. As a result, atmospheric air will be delivered to the plenum chambers 25 and 26 through this system just described.

The main casting of the induction system 24 is provided with a plurality of runner sections 36 that extend from the plenum chambers 25 to the plenum chamber 26 and which form internal passageways. In a similar manner, there are a plurality of runners 37 that extend from the plenum chamber 26 to the plenum chamber 25 and which form internal passageways. The passageways formed by the runners 36 have inlet ends that open into the plenum chamber 25 and which terminate at outlet ends which communicate directly with the passageways 29 associated with the plenum chamber 26. In a like manner, the runners 37 extend from inlet openings formed in the plenum chamber 26 and terminate in the passageways 29 of the plenum chamber 25. It should be noted that these passageways have respective curved portions that extend through the plenum chamber opposite that from which they emanate.

The runners as thus far described (36 and 37) thus form relatively long intake passages that extend from each plenum chamber 25 or 26 to an intake passage 18 of the opposite cylinder head 16 or 15. These relatively long intake passages can be tuned to provide good induction system performance at low and mid ranges and thus provide very good low and mid range performance for the engine.

In order to provide good high speed performance and tuning of the induction system 24 for high speed, each plenum chamber 25 and 26 is provided with a relatively short intake passage 38 which has an inlet opening in communication with that plenum chamber and an outlet opening that extends tangentially to the curved portion of the passageway formed by the respective runner 36 or 37. The passageways 38 serve the intake passages 18 of the adjacent cylinder heads 15 and 16 and hence provide good high speed performance.

There are provided individual butterfly type throttle valves 39 adjacent the inlet openings of each of the intake passages 38, all of which are supported on a common throttle valve shaft 31 that extends through the respective plenum chamber 25 or 26. These throttle valve shafts 41 are connected to an actuator of a vacuum type motor 42 that is responsive to induction system vacuum and which will hold the throttle valves 39 in their closed position during low and mid range performance. As a result, under this running condition, only the longer intake passages formed by the runners 36 and 37 will serve the individual intake passages 18 of the cylinder heads 15 and 16. However, as the high speed condition is approached, the throttle valves 39 will be opened by the vacuum motors 42 and supplement the air flow to the cylinder head intake passages 18 and also, as noted, improve the tuning for high speed performance.

Rather than operating the throttle valves 39 by vacuum motors, a suitable linkage system can be employed for opening these throttle valves in a stages relationship to the main throttle valve of the engine. Other forms of throttle valve actuating mechanisms may be employed. In order to facilitate adjustment of idle speed when the throttle valve associated with the inlet 32 is closed, there is provided a control valve 43 for controlling the amount of air bypassing the manually controlled throttle valve.

Figure 4:
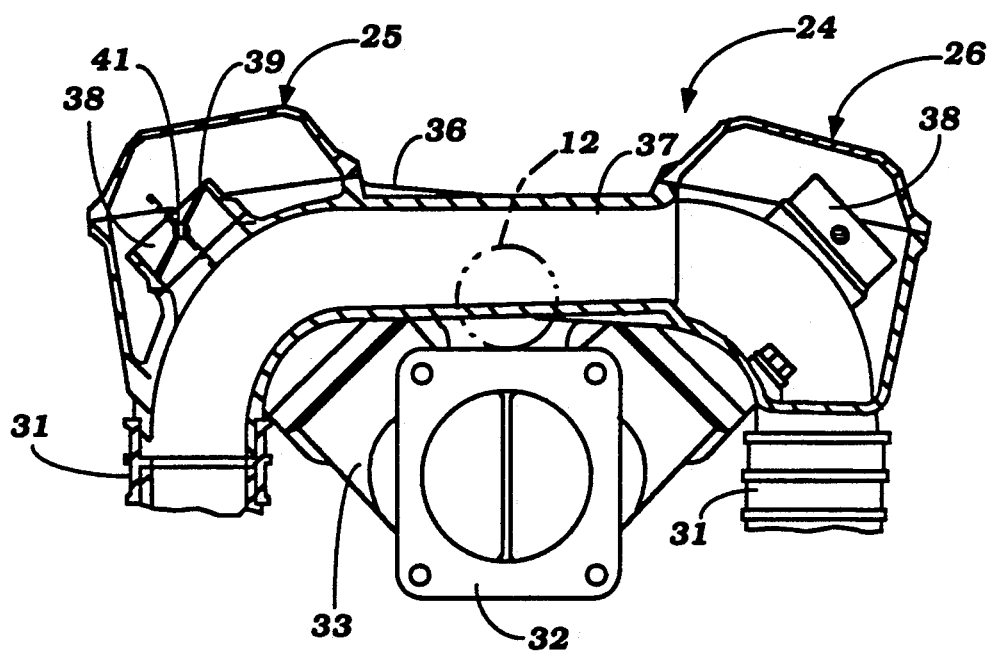
FIG. 4 is a partial end elevational view, in part similar to FIG. 1, showing another embodiment of the invention.

In the embodiment of the invention as thus far described, the engine has very good efficiency throughout the entire engine load and speed ranges and yet the induction system 24 is very compact. It should be noted that the second or high speed intake passages 38 extend generally in a straight line and thus have little flow resistance, particularly due to their tangential intersection with the curved first passages formed by the runners 36 and 37. However, this configuration does add somewhat to the height. FIG. 4 shows another embodiment which is substantially the same in function as the embodiment of FIGS. 1 through 3. For this reason, those components which are the same have been identified by the same reference numerals. However, in this embodiment, the intake passages 38 intersect the curved portions of the intake passages formed by the runners 36 and 37 in a radial direction and thus provide a more compact assembly insofar as the height is concerned. In all other regards, this embodiment is the same as the previously described embodiment.

It should be readily apparent from the foregoing description that the two embodiments of the invention illustrated and described are highly effective in providing a high efficiency compact induction system for a V type engine. It is to be understood, however, that the foregoing description is that of preferred embodiments of the invention. Various changes and modifications may be made without departing from the spirit and scope of the invention, as defined by the appended claims.

We claim:

1. An induction system for a V type engine comprised of a pair of angularly disposed cylinder banks, each formed with at least one cylinder, first and second plenum chambers each lying above a respective one of said cylinder banks, means for admitting an atmospheric air charge to said plenum chambers, a pair of first intake passages each having an inlet opening in one of said plenum chambers and an outlet communicating with the cylinder of the opposite cylinder bank and an intermediate portion passing at least in part through the other plenum chamber, a pair of second intake passages, each extending from one of said plenum chambers to the cylinder of the adjacent cylinder bank, each of said plenum chambers having an upper surface formed at least in part by a removable cover plate for affording access to the interior of the respective plenum chamber when said cover plate is removed.

2. An induction system as set forth in claim 1 wherein the intermediate portion of the first intake passages lies completely within the other plenum chamber.

3. An induction system as set forth in claim 1 wherein the means for admitting an atmospheric charge to the plenum chambers comprises an induction device having inlet openings into the lower walls of the plenum chambers and extending beneath the first intake passages.

4. An induction system as set forth in claim 3 wherein the intake device has a generally Y shaped configuration.

5. An induction system as set forth in claim 1 wherein the intermediate portion is curved.

6. An induction system as set forth in claim 5 wherein the second intake passage communicates with the first intake passage at its curved portion.

7. An induction system as set forth in claim 6 wherein the second intake passage extends tangentially to the curved portion of the first intake passage and in a direction toward its outlet.

8. An induction system as set forth in claim 7 further including throttle valve means for controlling the flow through the second intake passages in response to an engine running condition.

9. An induction system as set forth in claim 6 wherein the means for admitting an atmospheric charge to the plenum chambers comprises an induction device having inlet openings into the lower walls of the plenum chambers and extending beneath the first intake passages.

10. An induction system as set forth in claim 9 wherein the intake device has a generally Y shaped configuration.

11. An induction system as set forth in claim 10 wherein the second intake passage extends tangentially to the curved portion of the first intake passage and in a direction toward its outlet.

12. An induction system as set forth in claim 11 further including throttle valve means for controlling the flow through the second intake passages in response to an engine running condition.

13. An induction system as set forth in claim 1 wherein the first and second intake passages each communicate with a common intake port for the cylinder head.

14. An induction system as set forth in claim 13 wherein the intermediate portion of the first intake passages lies completely within the other plenum chamber.

15. An induction system as set forth in claim 13 wherein the means for admitting an atmospheric charge to the plenum chambers comprises an induction device having inlet openings into the lower walls of the plenum chambers and extending beneath the first intake passages.

16. An induction system as set forth in claim 15 wherein the intake device has a generally Y shaped configuration.

17. An induction system as set forth in claim 13 wherein the intermediate portion is curved.

18. An induction system as set forth in claim 17 wherein the second intake passage communicates with the first intake passage at its curved portion.

19. An induction system as set forth in claim 18 wherein the second intake passage extends tangentially to the curved portion of the first intake passage and in a direction toward its outlet.

20. An induction system as set forth in claim 19 further including throttle valve means for controlling the flow through the second intake passage in response to an engine running condition.

21. An induction system as set forth in claim 18 wherein the means for admitting an atmospheric charge to the plenum chambers comprises an induction device having inlet openings into the lower walls of the plenum chambers and extending beneath the first intake passages.

22. An induction system as set forth in claim 21 wherein the intake device has a generally Y shaped configuration.

23. An induction system as set forth in claim 22 wherein the second intake passage extends tangentially to the curved portion of the first intake passage and in a direction toward its outlet.

24. An induction system as set forth in claim 23 further including throttle valve means for controlling the flow through the second intake passages in response to an engine running condition.

25. An induction system for a V type engine comprised of a pair of angularly disposed cylinder banks, each formed with at least one cylinder, first and second plenum chambers each lying above a respective one of said cylinder banks, a pair of first intake passages each having an inlet opening in one of said plenum chambers and an outlet communicating with the cylinder of the opposite cylinder bank and an intermediate portion passing at least in part through the other plenum chamber, a pair of second intake passages, each extending from one of said plenum chambers to the cylinder of the adjacent cylinder bank, and means for admitting an atmospheric charge to said plenum chambers comprising an induction device having inlet openings into the lower walls of said plenum chambers and extending beneath the first intake passages.

26. An induction system as set forth in claim 25 wherein the intermediate portion of the first intake passages lies completely within the other plenum chamber.

27. An induction system as set forth in claim 25 wherein the intake device has a generally Y shaped configuration.

28. An induction system as set forth in claim 25 wherein the intermediate portion is curved.

29. An induction system as set forth in claim 28 wherein the second intake passage communicates with the first intake passage and its curved portion.

30. An induction system as set forth in claim 29 wherein the second intake passage extends tangentially to the curved portion of the first intake passage and in a direction toward its outlet.

31. An induction system as set forth in claim 30 further including throttle valve means for controlling the flow through the second intake passages in response to an engine running condition.

32. An induction system as set forth in claim 25 further including throttle valve means for controlling the flow through the second intake passages in response to an engine running condition.

33. An induction system as set forth in claim 25 wherein the first and second intake passages each communicate with a common intake port for the cylinder head.

34. An induction system as set forth in claim 33 wherein the intermediate portion of the first intake passages lies completely within the other plenum chamber.

35. An induction system as set forth in claim 33 wherein the intermediate portion is curved.

36. An induction system as set forth in claim 35 wherein the second intake passage communicates with the first intake passage at its curved portion.

37. An induction system as set forth in claim 36 wherein the second intake passage extend tangentially to the curved portion of the first intake passage and in a direction toward it outlet.

38. An induction system as set forth in claim 37 further including throttle valve means for controlling the flow through the second intake passages in response to an engine running condition.

39. An induction system for a V type engine comprised of a pair of angularly disposed cylinder banks, each formed with at least one cylinder, first and second plenum chambers each lying above a respective one of said cylinder banks, means for admitting an atmospheric air charge to said plenum chambers, a pair of first intake passages each having an inlet opening in one of said plenum chambers and an outlet communicating with the cylinder of the opposite cylinder bank and an intermediate portion passing at least in part through the other plenum chamber, and a pair of second intake passages, each defined in part by a tuning neck extending from within one of said plenum chambers to the cylinder of the adjacent cylinder bank.

40. An induction system as set forth in claim 39 wherein the intermediate portion of the first intake passages lies completely within the other plenum chamber.

41. An induction system as set forth in claim 39 wherein the means for admitting an atmospheric charge to the plenum chambers comprises an induction device having inlet openings into the lower walls of the plenum chambers and extending beneath the first intake passages.

42. An induction system as set forth in claim 39 wherein the intake device has a generally Y shaped configuration.

43. An induction system as set forth in claim 39 wherein the intermediate portion is curved.

44. An induction system as set forth in claim 43 wherein each of tuning necks of the second intake passage communicates with the first intake passage at its curved portion.

45. An induction system as set forth in claim 44 wherein the tuning neck extends tangentially to the curved portion of the first intake passage and in a direct toward its outlet.

46. An induction system as set forth in claim 45 further including throttle valve means in the tuning necks for controlling the flow through the second intake passages.

47. An induction system as set forth in claim 44 wherein the means for admitting an atmospheric charge to the plenum chambers comprises an induction device having inlet openings into the lower walls of the plenum chambers and extending beneath the first intake passages.

48. An induction system as set forth in claim 47 wherein the tuning neck extends tangentially to the curved portion of the first intake passage and in a direction toward its outlet.

49. An induction system as set forth in claim 48 further including throttle valve means in the tuning necks for controlling the flow through the second intake passages in response to an engine running condition.

50. An induction system as set forth in claim 46 wherein the first and second intake passages each communicate with a common intake port for the cylinder head.

51. An induction system as set forth in claim 49 wherein the intermediate portion of the first intake passages lies completely within the other plenum chamber.

52. An induction system as set forth in claim 50 wherein the means for admitting an atmospheric charge to the plenum chambers comprises an induction device having inlet openings into the lower walls of the plenum chambers and extending beneath the first intake passages.

53. An induction system as set forth in claim 52 wherein the intake device has a generally Y shaped configuration.

54. An induction system as set forth in claim 50 wherein the intermediate portion is curved.

55. An induction system as set forth in claim 54 wherein the tuning neck communicates with the first intake passage at its curved portion.

56. An induction system as set forth in claim 55 wherein the tuning neck extends longitudinally to the curved portion of the first intake passage and in a direction toward its outlet.

57. An induction system as set forth in claim 55 further including throttle valve means in the tuning necks for controlling the flow through the second intake passages in response to an engine running condition.

58. An induction system as set forth in claim 55 wherein the means for admitting an atmospheric charge to the plenum chambers comprises an induction device having inlet openings into the lower walls of the plenum chambers and extending beneath the first intake passages.

59. In induction system as set forth in claim 58 wherein the intake device has a generally Y shaped configuration.

60. An induction system as set forth in claim 59 wherein the tuning neck extends tangentially to the curved portion of the first intake passage and in a direction toward its outlet.

61. An induction system as set forth in claim 60 further including throttle valve means in the tuning necks for controlling the flow through the second intake passages in response to an engine running condition.

* * * * *

UNITED STATES PATENT AND TRADEMARK OFFICE
CERTIFICATE OF CORRECTION

PATENT NO. : 5,005,536
DATED : April 9, 1991
INVENTOR(S) : Suzuki, et al

It is certified that error appears in the above-identified patent and that said Letters Patent is hereby corrected as shown below:

On the Title Page under "Assignee", delete "Shingai, Japan; Yamaha Hatsudoki Kabushiki Kaisha, Yamaha Hatsudoki Kabushiki Kaisha, Shizuoka, Japan".

On the Title Page under "Related U.S. Application Data", "Jan." should be --Nov.--.

Column 8, line 47, Claim 50, "46" should be --39--.

Column 8, line 51, Claim 51, "49" should be --50--.

Column 9, line 2, Claim 56, "longitudinally" should be --tangentially--.

Column 9, line 5, Claim 57, "55" should be --56--.

Signed and Sealed this

Fifteenth Day of June, 1993

Attest:

MICHAEL K. KIRK

*Attesting Officer*     *Acting Commissioner of Patents and Trademarks*